United States Patent [19]

Liedek et al.

[11] 4,222,788

[45] Sep. 16, 1980

[54] MIXED PIGMENT AND PROCESS OF PREPARING THE SAME

[75] Inventors: Egon Liedek, Esslingen; Peter Dimroth, Mannheim; Wolfgang Ruff, Stuttgart; Gerhard Berger, Stuttgart; Peter Reiter, Stuttgart, all of Fed. Rep. of Germany

[73] Assignee: BASF Farben & Fasern AG, Hamburg, Fed. Rep. of Germany

[21] Appl. No.: 5,700

[22] Filed: Jan. 23, 1979

[30] Foreign Application Priority Data

Jan. 24, 1978 [AT] Austria .................................... 518/78

[51] Int. Cl.² ............................................. C09B 63/00
[52] U.S. Cl. ..................................... 106/289; 106/299
[58] Field of Search ................................ 106/289, 299

[56] References Cited

U.S. PATENT DOCUMENTS

| | | | |
|---|---|---|---|
| 1,995,933 | 3/1935 | Laska et al. ............................ | 106/289 |
| 2,117,859 | 5/1938 | Siegel ..................................... | 106/289 |
| 2,249,314 | 7/1941 | Lang ...................................... | 106/289 |
| 2,267,867 | 12/1941 | Kienle ................................... | 106/289 |
| 2,294,306 | 8/1942 | Lang ...................................... | 106/289 |
| 3,459,572 | 8/1969 | Lee ........................................ | 106/289 |
| 3,716,388 | 2/1973 | Lopez et al. .......................... | 106/289 |
| 3,761,297 | 9/1973 | Figueras ................................ | 106/289 |

*Primary Examiner*—James Poer
*Attorney, Agent, or Firm*—Toren, McGeady and Stanger

[57] ABSTRACT

Mixed pigments containing an organic pigment component and an inorganic pigment component imparting improved gloss and other desirable properties to organic coatings containing the same in relatively large amounts are prepared by synthesizing the organic component in the presence of the inorganic component in a liquid medium inert to the inorganic component, such as nickel titanium yellow or chromium titanium yellow.

6 Claims, No Drawings

MIXED PIGMENT AND PROCESS OF PREPARING THE SAME

This invention relates to mixed pigment compositions having an organic pigment component and an inorganic pigment component, and to a process of preparing the same.

It is known to mix inorganic pigments, such as nickel titanium yellow, chromium titanium yellow, and other reaction products of titanium oxide with a color-imparting metal oxide, with organic pigments, and to employ the pigment mixtures in organic coatings. The coatings often show unsatisfactory gloss, particularly when the pigment in the coating amounts to 10 percent or more of the coating weight on a dry basis. Because of the importance of high gloss in many applications, the mixed pigments have not found the wide use for which other valuable properties may qualify them. When the pigment mixtures are prepared by dry mixing of the powders in grinders or pug mills, the hiding or covering power and the weather resistance of the mixtures may also be impaired.

It has now been found that such defects of mechanically prepared pigment mixtures can be mitigated or avoided if the inorganic pigment component is admixed to the organic pigment component during the preparation of the latter by synthesis in a chemical reaction in a liquid medium, and by recovery of the purified organic pigment component from the resulting reaction mixture.

It is essential that the inorganic pigment component be admixed to the organic component prior to the recovery of the latter in its final, purified condition. If the pigment is prepared by coupling a diazonium salt, the coupling reaction may be carried out in the presence of the inorganic component. If the organic component is prepared by a condensation reaction, the latter may be performed in the presence of the inorganic component. If the organic pigment is subjected to purification after synthesis, the inorganic component may be added during the aftertreatment and prior to the recovery of the organic pigment in its ultimate condition.

The liquid medium in which the organic synthesis is performed must be inert to the inorganic pigment present, and the latter does not materially affect the synthesis. As compared to a corresponding reaction in the absence of the inorganic pigment, the reaction conditions may be modified slightly in view of the inert solid matter present in the reaction mixture, as by increasing the reaction temperature, decreasing the concentration of reactants, and particularly by adding minor amounts of surface active agents or reaction modifiers such as imides of phthalic acid, trimellitic acid, or pyromellitic acid, amines or polyamines, or insoluble, finely particulate condensation products of low or high molecular weight, emulsifiers, recrystallization inhibitors, and the like.

The organic pigments useful in this invention include, but are not limited to, insoluble dyes of various classes, such as the azo dyes Pigment Yellow C.I. 3, C.I. 13, C.I. 16, C.I.81, C.I.83, Pigment Orange C.I.5, C.I. 34, C.I.38, Pigment Red C.I.3, C.I.48/3, C.I.112, C.I.175, C.I.144, C.I.170, the polycyclic dyes Pigment Yellow C.I.109, C.I.138, C.I.108, C.I.139, C.I.112, C.I. 110, Pigment Orange C.I.43, Pigment Red C.I.216, C.I.149, C.I.179, C.I.123, C.I.178, C.I.200, Pigment Violet C.I.19, C.I.23, or metal complexes such as phthalocyanines or Pigment Yellow C.I.117.

The preferred inorganic components are nickel titanium yellow, and chromium titanium yellow.

The mixed pigments of the invention are used conventionally for coloring organic coatings whose resin component may consist mainly of acrylic or melamine resins, but are also employed to advantage as coloring matter in synthetic resin structures, particularly those based on thermoplastic resins, such as polyvinyl chloride or polystyrene. They have also been incorporated in otherwise conventional printing inks, and other applications will readily suggest themselves. The products containing the mixed pigments of the invention are distinguished by better gloss and/or better covering power from otherwise analogous products employing mechanically produced mixtures of the same pigments.

The following Examples are further illustrative of this invention. All percentage values, parts, and ratios are by weight unless specifically stated otherwise. All temperatures are in degrees Celsius.

EXAMPLE 1

12.4 g Ethyl cyanoacetate (0.11 mole) was added dropwise to 35 g 25% aqueous ammonia solution, and the resulting mixture was stirred two hours at 60°. After addition of 150 ml water and 12.8 g barbituric acid, stirring was continued at 60° for two hours. The mixture then had a pH value of approximately 9. 0.1 Mole diiminoisoindolenine glycol adduct of Formula (I) was

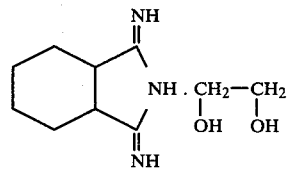

dissolved in ethyleneglycol and methanol, the solution was added to the previously produced mixture, and the pH was adjusted to 3 with sulfuric acid. Stirring at 60° was resumed for two hours, and the entire product was filtered with suction, the solid residue on the filter was washed with warm water and then dried.

The brilliantly yellow pigment of Formula (II) (Pigment 1A) recovered thereby weighed 23 g, was lightfast and insoluble. When

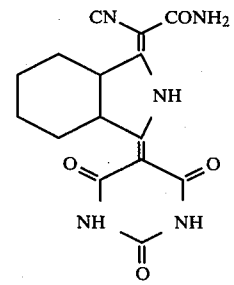

the pigment was dispersed in a vehicle in an amount of 10% on a dry basis and coatings were prepared from the material, they showed strong color, but poor gloss.

The procedure outlined above was repeated, but 71 g 45% nickel titanium yellow suspension was added to the afore-mentioned mixture at pH 9 prior to adding the diiminoisoindolenine glycol adduct solution. The yellow pigment powder ultimately recovered weighed 56 g (Pigment 1B).

In repeating the steps described in the preparation of Pigment 1B, the nickel titanium yellow suspension was replaced by an equal weight of a chromium titanium yellow suspension (Sico Fast Yellow 4GF). 56 g Yellow Pigment 1C was obtained.

For comparison purposes, two batches of the organic Pigment 1A initially prepared were mixed mechanically with dry nickel titanium yellow and dry chromium titanium yellow respsectively in amounts corresponding to those in Pigments 1B and 1C. When incorporated in identical vehicles in equal amounts, the mixtures of Pigment 1A with the inorganic pigment components produced coatings inferior in their gloss to otherwise analogous coatings prepared from Pigments 1B and 1C.

EXAMPLE 2

75 g Aminoquinaldine hydrochloride was mixed in a flask with 500 g phenol, and 30 g potassium carbonate was added in small batches until moist reagent paper indicated that the mixture had a pH value of 6–7. Nitrogen was blown into the flask while its contents were heated to 135° whereby water was distilled off. After 30 minutes at 135°, 270 g tetrachlorophthalic anhydride was added batchwise, and the contents of the flask were stirred one hour at 140°, thereafter three hours at 180°, and ultimately six hours at 180°–185°. This was followed by cooling to 80°, and the dropwise addition of 50 ml ethanol. The product in the flask was then filtered with suction, washed with water, and dried. There were obtained 225 g Pigment 2A of the following formula

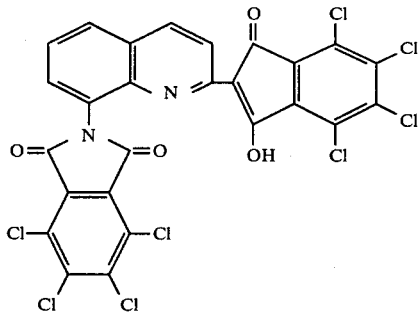
III

The above procedure was repeated, but 422 g nickel titanium yellow as a 45% paste and 600 g phenol were added to the flask together with the tetrachlorophthalic anhydride. The resulting Pigment 2B weighed 412 g and contained approximately equal amounts of Pigment 2A and of nickel titanium yellow.

Pigment 2B dispersed at a concentration of 10% (dry basis) in a suitable vehicle produced coatings of better gloss than a mixture of Pigment 2A and nickel titanium yellow prepared dry by mechanical mixing.

EXAMPLE 3

28 Parts of an amine of Formula (IV) were added to 1000

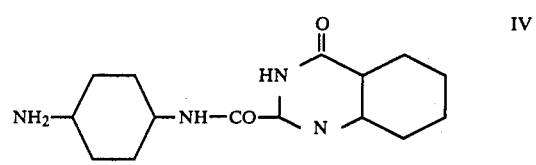
IV parts N-methylpyrrolidone, followed by 37.8 parts of the acyl chloride of Formula V. Ultimately, 0.5 parts imidazole was added, and the mixture was stirred overnight. Thereafter, 250 ml water

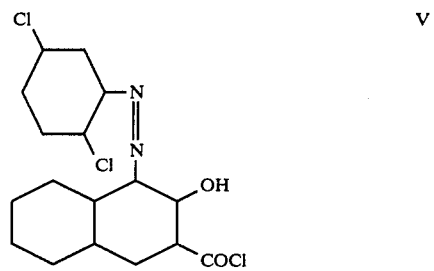
V was added, and a temperature at 90° was maintained for one hour. The mixture then was filtered with suction, and the solids recovered were washed with water and dried. 59 Parts orange-red Pigment 3A was obtained.

When 60 parts dry nickel titanium yellow were added to the N-methylpyrrolidone just prior to the acyl chloride (V), an orange-red Pigment 3B was obtained in an amount of 119 parts.

120 Parts orange-red Pigment 3C were recovered when the nickel titanium yellow was replaced by chromium titanium yellow.

The Pigments 3B and 3C were superior to pigment mixtures prepared from Pigment 3A and the respective inorganic pigments by dry mixing in the gloss of coatings prepared as in the preceding Examples.

EXAMPLE 4

124.8 Parts aminoterephthalic acid dimethyl ester was diazotized in a conventional manner in aqueous hydrochloric acid solution by means of sodium nitrite, and the diazonium salt so prepared was coupled with 82.2 parts di-acetoacetyl-p-phenylenediamine finely dispersed in water. The pH of the coupling suspension so prepared was adjusted to 7, the suspension was stirred 10 hours, filtered with suction, and the yellow powder obtained was washed thoroughly on the filter with water and ethanol, then dried in a vacuum at 50°. It weighed 195 g and was divided into three equal parts.

One part was refluxed with stirring in one liter butanol and 150 ml water for two hours, filtered with suction and dried. 54 g Yellow Pigment 4A was recovered.

The second part was refluxed with stirring in one liter butanol together with 144 g nickel titanium yellow in 45% aqueous suspension and 50 ml water for two hours. 121 g Yellow Pigment 4B was recovered by filtering, washing, and drying as above. It produced coatings of better gloss than an equivalent dry mixture of Pigment 4A and nickel titanium yellow.

The third part was converted to 119 g yellow Pigment 4C in a procedure analogous to the preparation of Pigment 4B, but substituting chromium titanium yellow for nickel titanium yellow. Coatings produced from Pigment 4C were superior in gloss to coatings produced from dry mixtures of Pigment 4A and chromium titanium yellow.

EXAMPLE 5

11.2 g 4-Chloro-2-nitraniline was stirred with 30 ml water. 22.6 Ml 30.5% hydrocholoric acid was added, and the mixture was cooled to 0° by means of ice and water. A solution of 4.664 g sodium nitrite in 14 ml water was added dropwise with stirring, and the excess of nitrite was destroyed with sulfamic acid. The resulting solution of a diazonium salt was added dropwise to a coupling composition prepared by dissolving 13.99 g aceto-acetic acid o-chloroanilide in 13.73 g 50% sodium hydroxide solution and 535 ml water, adding 25.65 g nickel titanium yellow, and thereafter again precipitating the dissolved coupling agent by the addition of 17.47 ml 60% acetic acid and 35 ml water.

After coupling, the resulting pigment suspension was stirred for a short time and filtered with suction. The solid material was washed until neutral and dried at 60°. The yellow mixed pigment so produced was superior in the pure hue and gloss of coatings produced therefrom as compared to equivalent mixtures prepared mechanically from equal amounts of the organic and inorganic pigment components. Analogous results were achieved when chromium titanium yellow was substituted for nickel titanium yellow, but the pigments so produced had a more reddish hue.

EXAMPLE 6

Nitrosylsulfuric acid was prepared conventionally from 33.4 ml 96% sulfuric acid and 5.8 g sodium nitrite. 15.02 g 2,4-Di-nitroaniline was added in small batches at 20°, and the resulting solution was stirred for 90 minutes. It was then mixed with ice water, the excess nitrite was destroyed by means of sulfamic acid, and 1.35 g coconut amine acetate was stirred into the solution so produced. A suspension of a coupling agent was prepared by dissolving 12.7 g $\beta$-naphthol and 3.7 g sodium hydroxide in 150 ml water, adding the naphthol solution dropwise to a mixture of 150 ml water and 3.2 ml concentrated sulfuric acid, and dispersing 106.52 g nickel titanium yellow in the suspension obtained thereby. Thereafter, the diazonium salt solution previously prepared was added drop by drop to the suspension containing the coupling agent. The pigment suspension so prepared was heated to boiling and filtered, and the orange-colored mixed pigment was washed neutral and dried at 60°. It contained organic and inorganic pigments in a ratio of 20:80, and was superior in covering power, gloss and purity of hue of coatings prepared therefrom from analogous coatings containing mixtures prepared mechanically from the dry pigments.

Products of more intense color were produced by increasing the organic pigment fraction. Analogous results were achieved when chromium titanium yellow was substituted for nickel titanium yellow.

EXAMPLE 7

20 Ml water, 0.01 g of a saturated fatty alcohol ester, and 7.74 g m-nitro-p-toluidine were mixed by stirring, and 10 ml water and 14.16 ml 30.5% hydrochloric acid were added. The resulting mixture was cooled and diazotized conventionally by adding an aqueous solution of 3.54 g sodium nitrite, and stirring.

A coupling composition was prepared by dissolving 7.6 g $\beta$-naphthol in 50 ml water and 4.35 g 50% sodium hydroxide, mixing the solution with a suspension of 15.64 g chromium titanium yellow in 75 ml water, and precipitating the coupling agent by means of 1.48 ml concentrated sulfuric acid. The previously prepared diazonium salt solution was added dropwise while the pH of the mixture was kept at 8 by additions of a solution of 7.1 g 50% sodium hydroxide and 0.425 g calcined sodium carbonate in 25 ml water.

The pigment suspension obtained after coupling was boiled and filtered with suction, and the red pigment was washed neutral on the filter and dried at 60°. It contained equal amounts of organic and inorganic pigment components and was distinguished particularly by the higher gloss and greater purity of hue of coatings prepared therefrom as compared to coatings prepared from equal amounts of the dry pigments mixed mechanically. When nickel titanium yellow was substituted for the chromium titanium yellow, a mixed pigment of similarly superior properties was produced.

EXAMPLE 8

20.38 g 2,3-Hydroxynaphthoic acid o-toluidide was dissolved hot in 356 g 1.63% sodium hydroxide solution, and the solution was diluted with 350 ml water, and 1.7 g of an ester sulfonate was added. The coupling agent so prepared was precipitated with 102 g 5.23% hydrochloric acid, and the resulting suspension was mixed with 77.61 g nickel titanium yellow and 10.5 g calcium carbonate. A solution prepared from 13.75 g 2,4,5-trichloroaniline in 202 g 5.05% hydrochloric acid and 65.68 g 80% acetic acid and diazotized in a coventional manner with 4.93 g sodium nitrite was added dropwise to the suspension of the coupling agent, and the resulting pigment suspension was heated first at 40°, thereafter boiled, and filtered. The recovered pigment was washed neutral and dried at 60°.

The red mixed pigment so prepared contained 30 parts organic and 70 parts inorganic pigment component. It was superior to mechanically prepared mixtures of the dry components in the covering power, gloss, and purity of hue of coatings prepared therefrom. Pigments of greater coloring power were obtained by increasing the organic pigment fraction. Chromium titanium yellow, when substituted for the nickel titanium yellow, yielded similarly superior pigments.

EXAMPLE 9

20.94 g Acetoacetylamino-2,4-dimethylbenzene was dissolved in 150 ml water containing 12 g sodium hydroxide. When the solution was added dropwise to 184 ml 11.75% acetic acid containing 1.03 g coconut amine acetate, the benzene derivative was again precipitated, and 76.76 g nickel titanium yellow was dispersed in the resulting suspension. 12.66 g 4,4'-Diamino-3,3'-dichlorodiphenyl was tetrazotized in a conventional manner with 32.98 g 37.2% hydrochloric acid, 7.04 g sodium nitrite, and 400 ml ice water, and the solution was added in a quick succession of drops at 20° to the pigment dispersion. After coupling, the resulting pigment suspension was boiled for 30 minutes and filtered. The recovered pigment was washed neutral and dried at 60°.

It contained organic and inorganic pigment components in a ratio of 30:70 and imparted to coatings better covering power, higher gloss, and purer hue than analogous, mechanically produced pigment mixtures.

EXAMPLE 10

16.66 g 1-(p-Tolyl)-3-methylpyrazolone-(5) was slurried as a coupling agent in 350 ml water together with 18.21 g nickel titanium yellow. A diazonium salt solution was prepared from 10.84 g 4,4'-diamino-3,3'-dichlorophenyl, 21.2 ml concentrated (37%) hydrochloric acid, 5.96 g sodium nitrite, and 500 ml ice water in a conventional manner and added gradually to the coupling composition within approximately one hour while a temperature of 30° was maintained. The mixture was stirred until the tetrazonium product no longer could be detected. The resulting pigment suspension was filtered, and the mixed pigment was washed neutral with water, and dried at 60°.

It had an orange color and contained the organic and inorganic components in a ratio of 60:40. It was superior to mechanically prepared mixtures of the dry pigments in the covering power, gloss, and purity of hue of coatings prepared therefrom. Even higher gloss at otherwise similar properties could be achieved by reducing the organic pigment fraction. Analogous products were obtained from chromium titanium yellow instead of the nickel titanium yellow.

EXAMPLE 11

A solution of 12.4 g 1-amino-4-methyl-5-chlorobenzene-2-sulfonic acid in 110 ml water containing 2.25 g sodium hydroxide at 80°-90° was added quickly to a suspension of 28 g nickel titanium yellow, 2.8 g coconut amine acetate in 90 ml ice water containing 10.06 ml 37% hydrochloric acid. The mixture was cooled with ice to 3°-5° and diazotized by adding an aqueous solution of 3.9 g sodium nitrite, and stirring for 20 minutes. The suspension then was stirred quickly into a coupling solution of 10.4 g 2,3-dihydroxynaphthoic acid, 5 g sodium hydroxide, and 0.55 g soda ash in 850 ml water.

After coupling, the suspension was stirred 30 minutes, thereafter boiled 30 minutes, and the sodium salt was converted to the lake by the addition of 8.2 g strontium chloride hexahydrate. The azo dye thus modified was filtered off after brief boiling, washed neutral, and dried at 60°.

A red mixed pigment containing equal amounts of organic and inorganic components was recovered and was superior to mechanically produced mixtures of the dry pigment components by the higher gloss and greater purity of hue as in the preceding Examples.

EXAMPLE 12

Nitrosylsulfuric acid was prepared from 73.28 ml 96% sulfuric acid and 8.28 g sodium nitrite, and 25.6 g 4-aminoaphthalic imide was added in small batches at 20°. After two hours of stirring, the solution was added to ice water, the aqueous mixture was stirred 45 minutes, and the excess nitrite was destroyed by means of sulfamic acid. The resulting suspension was added drop by drop at 10°-20° to a coupling composition prepared by dissolving 19.45 g 2,6-dihydroxy-4-methyl-3-cyanopyridine in 400 ml water containing 4.96 g sodium hydroxide, and adding the solution dropwise to a suspension of 65.18 g nickel titanium yellow in 175 ml water containing 11.2 ml 37.2% hydrochloric acid. After termination of the coupling reaction, the pigment suspension was mixed with 0.44 g of an ester sulfonate, briefly heated to boiling, and filtered. The recovered solids were washed neutral and dried at 60°.

A mixed pigment of yellowish red color was obtained and contained organic and inorganic components in a ratio of 40:60. It was superior to mechanically prepared mixtures of the dry pigments in the better covering power, higher gloss, and purer hue of coatings prepared under otherwise identical conditions. Even higher gloss could be achieved by means of the mixed pigments of the invention by increasing the organic fraction. Similar products were obtained by substituting chromium titanium yellow for the nickel titanium yellow described above.

EXAMPLE 13

Nitrosylsulfuric acid was prepared from 16.34 ml concentrated sulfuric acid and 2.88 g sodium nitrite, and was diluted with 47.99 ml concentrated sulfuric acid. 6.38 g 3,3'-5,5'-Tetrachlorobenzidine was added, the mixture was stirred, poured on ice, filtered with suction, and the nitrite excess was destroyed with sulfamic acid. The solution so obtained was added drop by drop to a coupling composition prepared by dissolving 5.95 g 2,6-dihydroxy-4-methyl-3-cyanopyridine in 150 ml water containing 1.799 g sodium hydroxide, precipitating the coupling agent by dropwise addition of 8.98 ml concentrated hydrochloric acid diluted with water, and thereafter dispersing 51.03 g nickel titanium yellow in the resulting suspension. After coupling, an aqueous solution of 1.28 g sorbitan trioleate was stirred into the pigment suspension which was boiled and filtered with suction. The recovered solids were washed neutral and dried at 60°. The red mixed pigment so prepared contained organic and inorganic components in a ratio of 20:80, and produced coatings of higher gloss, purer hue, and greater color intensity than otherwise analogous mechanically prepared mixtures of the dry pigment components. Chromium titanium yellow could be substituted for equal amounts of the nickel titanium yellow to produce a mixed pigment of similar properties.

EXAMPLE 14

223 g 1-Aminoanthraquinone was diazotized in aqueous hydrochloric acid with sodium nitrite, the excess nitrite was destroyed by means of sulfamic acid, and the diazonium salt solution was stripped of suspended solid matter by means of fuller's earth. The solution then was added dropwise to a coupling composition which was an aqueous suspension of 121.6 g barbituric acid, sodium acetate, and 362 g nickel titanium yellow. The suspended pigments were filtered off, washed neutral, and dried at 60°.

A yellow mixed pigment containing equal weights of organic and inorganic pigment components was produced. It was superior to mechanically produced mixtures of the dry pigment powders by the better covering power and higher gloss of coatings prepared therefrom. Further improvements in covering power and gloss could be achieved by an after-treatment of the mixed pigment with organic solvents. Chromium titanium yellow yielded analogous mixed pigments.

EXAMPLE 15

20.92 g 2-Aminoterephthalic acid dimethyl ester was diazotized in aqueous hydrochloric acid by means of sodium nitrite, and the diazonium salt solution so produced was added dropwise to a coupling composition prepared by dissolving 23.42 g 1-acetamino-4-acetoacetylaminobenzene in sodium hydroxide solution, and by precipitating the compound in a suspension of 56.59 g nickel titanium yellow acidified with acetic acid. The resulting pigment suspension was boiled for 30 minutes and filtered. The recovered solids were washed neutral and dried at 60°. The yellow mixed pigment so obtained contained organic and inorganic pigment components in equal amounts. It was superior to the corresponding, mechanically produced mixture of the dry pigment components by the higher gloss and better covering power of coatings produced therefrom. Closely similar properties were found in products prepared from chromium titanium yellow instead of nickel titanium yellow.

While the invention has been described with particular reference to specific embodiments, it is to be understood that it is not limited thereto, but is to be construed broadly and restricted solely by the scope of the appended claims.

What is claimed is:

1. A process for preparing a mixed pigment having an organic pigment component and an inorganic pigment component consisting essentially of a reaction product of titanium dioxide with a color-imparting metal oxide, comprising:

(a) synthesizing the organic pigment component by a chemical reaction in a liquid medium;
(b) admixing said inorganic pigment component with said organic pigment component; and
(c) recovering the purified mixed pigment from the resulting reaction mixture in the dry state.

2. The process of claim 1 wherein the reaction product is nickel titanium yellow or chromium titanium yellow.

3. The process of claim 1 wherein the organic pigment component is synthesized by a chemical reaction performed in a liquid medium, said inorganic pigment component being dispersed in said medium and being inert to the medium and the reactants.

4. The process of claim 1 wherein the organic pigment component is synthesized by a condensation reaction in the presence of said inorganic pigment component.

5. The process of claim 1 wherein the organic pigment component is synthesized by a coupling reaction in the presence of said inorganic pigment component.

6. A mixed pigment prepared by the process of claim 1, 2 or 3.

* * * * *